United States Patent
Moore

(10) Patent No.: US 7,336,858 B1
(45) Date of Patent: Feb. 26, 2008

(54) IN-FIBER OPTICAL ISOLATOR FOR HIGH-POWER OPERATION

(75) Inventor: Gerald T. Moore, Albuquerque, NM (US)

(73) Assignee: The United States of America as Represented by the Secretary of the Airforce, Washington, DC (US)

( * ) Notice: Subject to any disclaimer, the term of this patent is extended or adjusted under 35 U.S.C. 154(b) by 0 days.

(21) Appl. No.: 11/626,095

(22) Filed: Mar. 8, 2007

(51) Int. Cl.
*G02B 6/00* (2006.01)
(52) U.S. Cl. ...................................................... 385/11
(58) Field of Classification Search ............. 385/11–13
See application file for complete search history.

(56) References Cited

U.S. PATENT DOCUMENTS

| | | | | | |
|---|---|---|---|---|---|
| 5,061,032 | A | * | 10/1991 | Meltz et al. | 385/37 |
| 5,689,519 | A | * | 11/1997 | Fermann et al. | 372/18 |
| 5,923,686 | A | * | 7/1999 | Fermann et al. | 372/18 |
| 6,339,661 | B1 | * | 1/2002 | Kokkelink et al. | 385/11 |
| 7,245,795 | B2 | * | 7/2007 | Walker et al. | 385/14 |

OTHER PUBLICATIONS

J.L. Cruz, M. V. Andres, and M. A. Hernandez, "Faraday effect in standard optical fibers: dispersion of the Verdet constant," Appl. Opt. 35, 922-927 (1996), vol. 35, No. 8 Feb. 1996.
E. H. Turner and R. H. Stolen, "Fiber Faraday circulator or isolator," Opt. Lett. 6, 322-324 (1981) vol. 6, No. 7, Jul. 1981.
J.-F. Lafortune and R. Vallée, "Short length fiber Faraday rotator," Opt. Commun. 86, 497-503 (1991), Dec. 1991, vol. 86, No. 6.
K. Zhou, G. Simpson, X. Chen, L. Zhang, and I. Bennion, "High extinction radio in-fiber polarizers based on 45° tilted fiber Bragg gratings," Opt. Lett. 30, 1285-1287 (2005, Jun. 1, 2005, vol. 30, No. 11.
Y. Li, M. Froggatt, and T. Erdogan, "Volume current method for analysis of tilted fiber gratings," J. Lightwave Technol. 19, 1580-1591 (2001), Oct. 2001.
H. C. Lefèvre, P. Simonpiétri, and P. Graindorge, "High performance polarisation splitting fibre coupler," Electron. Lett. 24, 1304-1305 (1988), Oct. 1988 vol. 24 No. 21.

* cited by examiner

*Primary Examiner*—Quyen P Leung
(74) *Attorney, Agent, or Firm*—Kenneth E. Callahan

(57) ABSTRACT

An in-fiber optical isolator for high-power operation using two kinds of fiber, not including the active fiber where laser gain occurs. A hi-birefringence passive fiber with a tilted Bragg grating is connected to the active fiber at one end with the connection region stripped and potted to remove pump and s-polarized signals. The other end of the hi-bi fiber is fusion spliced to a low-birefringence fiber and oriented so that the birefringent axes are parallel. The low-bi fiber then passes straight through a gap in a linear magnetic array calculated to cause a 45 degree Faraday rotation. The far end of the low-bi fiber is connected to another hi-birefringence passive fiber with a tilted Bragg grating but with the birefringent axes of the hi-bi rotated by 45 degrees with respect to those of the low-bi fiber. Backward light transmitted by the second Bragg grating will then be removed by the first Bragg grating.

4 Claims, 7 Drawing Sheets

In-fiber Optical Isolator
(not to scale)

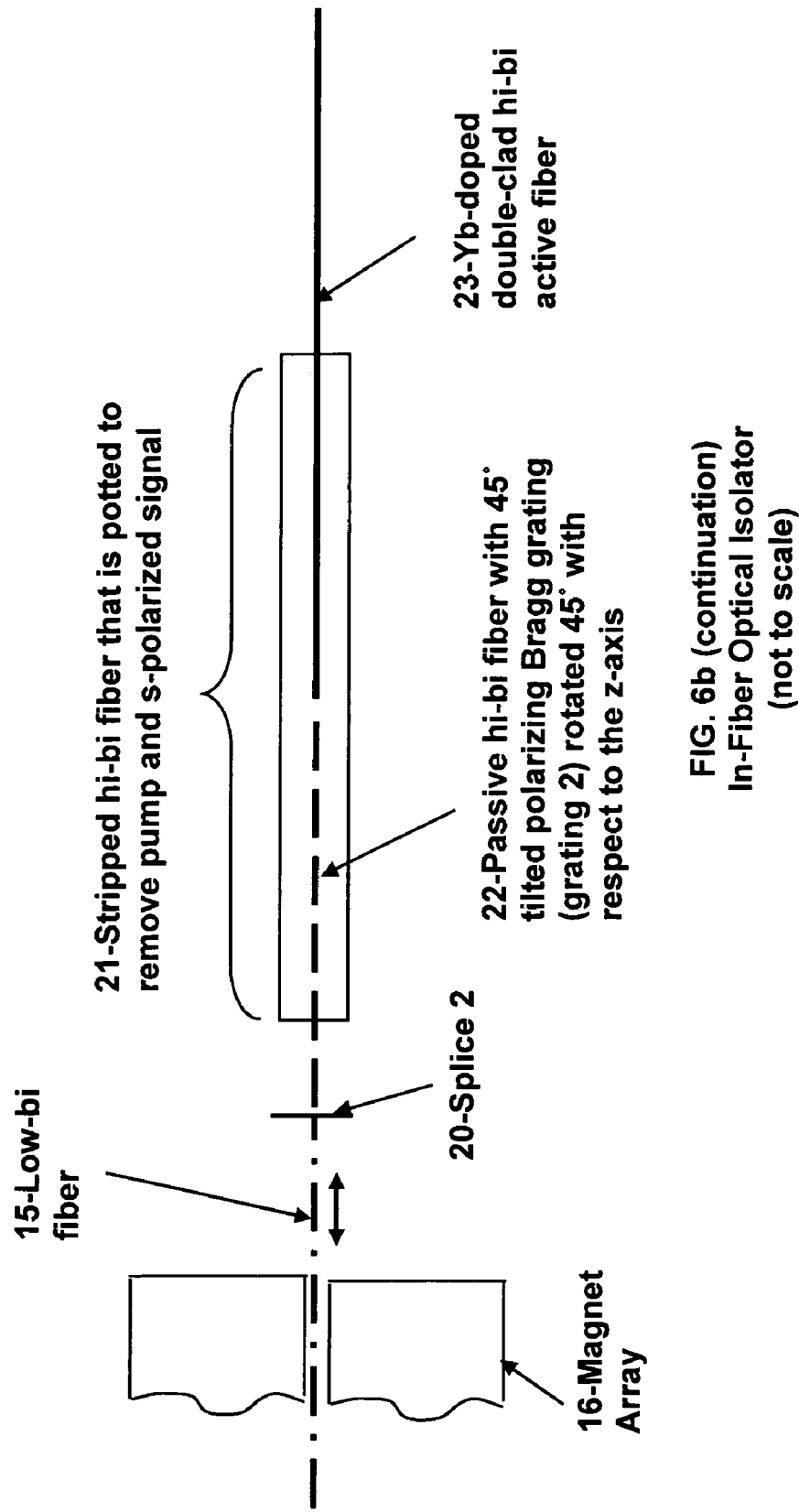
FIG. 6b (continuation)
In-Fiber Optical Isolator
(not to scale)

IN-FIBER OPTICAL ISOLATOR FOR HIGH-POWER OPERATION

STATEMENT OF GOVERNMENT INTEREST

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF THE INVENTION

Reflected or backscattered light in optical fiber transmission lines caused by the presence of optical components in the lines results in poor transmission performance. The backward propagation of light can damage components at the low-power end of fiber amplifiers. Backward light is amplified both by the gain medium and, for narrow-spectral-band amplifiers, by stimulated Brillouin scattering (SBS). The backward light generated by SBS is down-shifted in frequency by the SBS Stokes frequency but is still within the amplifier gain bandwidth. Optical isolators of various designs are used to eliminate the adverse effects of returned beams. Narrow-band amplifiers are needed for coherent beam combination by active phasing of multiple amplifier chains. A high-power fiber-amplifier system can require multiple isolators, both in series within a chain and in parallel if there are multiple chains. The isolators currently available for use with fiber lasers and amplifiers are limited to about 10 Watts power and have significant loss. These isolators are inadequate for fiber lasers and amplifiers currently reaching several kilowatts of power. Using bulk isolators and re-injecting light into fiber leads to undesirable alignment sensitivity.

An isolator consists of a Faraday rotator sandwiched between two linear polarizers, and may also include birefringent material. Although the Verdet constant V=1.28 (rad/T m) $(\mu m/\lambda)^2$ characterizing the strength of Faraday rotation is small in fused silica, it is nevertheless possible to achieve the required 45° Faraday rotation in a silica fiber (J. L. Cruz, M. V. Andres, and M. A. Hernandez, "Faraday effect in standard optical fibers: dispersion of the Verdet constant," Appl. Opt. 35, 922-927 (1996)). The Faraday rotation is the product of the Verdet constant, the effective longitudinal magnetic field, and the length of the magnet array. Since the magnet array producing the Faraday rotation is sizable, it is highly desirable that a single magnet array be usable for multiple isolators.

Turner and Stolen succeeded in producing a 45° Faraday rotation of the polarization of 632.8-nm and 830-nm light in birefringent fiber (E. H. Turner and R. H. Stolen, "Fiber Faraday circulator or isolator," Opt. Lett. 6, 322-324 (1981)). For the 632.8-nm work the fiber was looped 9 times through slots in an array of 14 samarium-cobalt magnets with alternating polarity. The period of the array was matched to the 3.3-cm beat length of the polarization modes. This may be termed magnetic quasi-phase matching. About 2 meters of the fiber was in the magnetic field; an additional 5 meters of fiber was in the loops. The magnet configuration was far from optimal, since the magnets were 0.53 cm long and separated by longitudinal gaps of 1.12 cm.

Lafortune and Vallée rotated the polarization of He—Ne laser light by 45° in only 40 cm of standard single-mode fiber (J.-F. Lafortune and R. Vallée, "Short length fiber Faraday rotator," Opt. Commun. 86, 497-503 (1991)). They used an array of 36 pairs of block-shaped NdFe magnets. The magnets within each pair were separated by a transverse gap and were oriented with the same longitudinal polarity. Alternate pairs were arrayed longitudinally and periodically with opposite polarities. The fiber passed longitudinally through the center of the transverse gap. The magnet pairs were separated by longitudinal gaps in order to insert glass plates about 1.7 mm in width which pushed transversely on the fiber to produce local birefringence. The pressure on the plates was adjusted to produce ½-wave of phase advance between the horizontal and vertical polarizations at each contact point. This produced a cumulative increase of the Faraday rotation in each segment. The output typically achieved a polarization intensity ratio of 25 to 30 dB. However, there were several disadvantageous features to this approach. First, it was necessary to strip the polymer cladding from the fiber in order to maintain constant pressure at the contact points. Second, there were average losses of 0.02-0.03 dB per contact point. Third, this configuration does not permit longitudinal displacement of the fiber when the glass plates are inserted or insertion of additional fibers into the transverse gap, which would allow a single magnet array to provide the Faraday rotation for multiple isolators.

Forty-five degree tilted fiber Bragg gratings written in the core of photosensitive fiber are suitable as polarizers for high-power in-fiber isolators. These gratings are under development at Aston University, Birmingham, UK. They transmit the p-polarization, while scattering the s-polarization out the side of the fiber. Writing a fiber grating requires the removal of the polymer jacket on a short section of the fiber. Zhou et al. reported an in-fiber polarizer with a polarization-extinction ratio (PER) of 33 dB near 1550 nm wavelength with a 5-cm grating (K. Zhou, G. Simpson, X. Chen, L. Zhang, and I. Bennion, "High extinction ratio in-fiber polarizers based on 45° tilted fiber Bragg gratings," Opt. Lett. 30, 1285-1287 (2005)). More recently, sponsored by US Air Force funding, this group achieved a 45 dB PER near 1099 nm. A theory of tilted fiber gratings indicates that the transmission of the p-polarization through 45° gratings is excellent (Y. Li, M. Froggatt, and T. Erdogan, "Volume current method for analysis of tilted fiber gratings," J. Lightwave Technol. 19, 1580-1591 (2001)).

SUMMARY OF THE INVENTION

The present invention is an in-fiber optical isolator suitable for use in high-power fiber-laser and fiber-amplifier systems. The active fibers in these systems are double-clad fibers with a glass core doped with Yb (or alternatively with Nd) ions. The core is surrounded by a glass inner cladding. Pump light propagating in the inner cladding and the core excites the ions, producing gain at the lasing wavelength. Both the active fiber and the passive fibers in the invented isolator incorporate stress rods in the cladding adjacent to the core which produce linear birefringence of a desired magnitude. The core radii and refractive indices of the different fibers are optimally matched in order that splices between fiber sections not produce significant losses or reflections. The purpose of the present invention is to prevent the backward propagation of light, while transmitting light in the forward direction with low loss. Since the transmitted light passes through the isolator inside the fiber core, the alignment sensitivity and loss associated with the use of bulk isolators is avoided. Backward propagation, which can cause damage and loss of power through processes such as stimulated Brillouin scattering, is also avoided. The isolator makes use of two types of fiber, not including the active polarization-maintaining fiber where laser gain occurs. Faraday rotation takes place in a low-birefringence (low-bi) fiber with a polarization beat length of about 2 cm at the lasing wavelength (typically 1064 nm). This beat length is matched to the period of a linear array of permanent magnets in a repelling configuration. The straight low-bi fiber traverses a gap in the magnet array, and 45-degree Faraday rotation occurs over a length of about 1 m at the 1064-nm wavelength. Both ends of the low-bi fiber are spliced to high-birefringence (hi-bi) polarization-maintaining photo-sensitive fiber. Splice 1 at one end is made with the birefringence axes of the low-bi and hi-bi fibers parallel. Splice 2 at the other end has the birefringence axes of the hi-bi fiber rotated by 45-degrees with respect to those of the low-bi fiber. The hi-bi fiber at each end contains 45-degree tilted fiber gratings 1 and 2 oriented with the birefringence axes. These gratings transmit p-polarized light, but scatter s-polarized light out the side of the fiber. The fiber can be translated longitudinally within the magnet array, allowing the positioning of splice 2 at a point where the light entering the second hi-bi fiber in the forward direction is linearly polarized and transmitted by grating 2. At this position backward light transmitted by grating 2 will be removed by grating 1, forming an isolator. Multiple isolators can make use of the same magnet array with fibers aligned parallel to each other within the magnet gap. The fibers are either single-mode, or propagation in higher-order modes is suppressed (e.g., by coiling the active fiber). The low-bi fiber traversing the magnet array is not coiled, but excitation of higher-order modes is expected to be small over the approximately 1-meter length of this fiber.

BRIEF DESCRIPTION OF THE DRAWINGS

FIG. 6b shows the other end of the in-fiber optical isolator of FIG. 6a.

DESCRIPTION OF THE PREFERRED EMBODIMENT

The invention uses magnetic quasi-phase matching, as in the work of Turner and Stolen. However, the low-birefringence (low-bi) fibers in which Faraday rotation takes place are held straight within the magnet array and pass through it only once. The array consists of pairs of block-shaped permanent magnets, such as NdFeB, separated by a gap where the fibers lie and butted against neighboring pairs in a repelling configuration as in FIG. 1. NdFeB magnets are available with a residual field of at least 1.33 T which are resistant to demagnetization for temperatures below 60° C. (See internet site www.mceproducts.com/materials). Analysis shows that 45° Faraday rotation of 1064-nm light from a Yb-doped fiber amplifier can be obtained using a magnet array with a length of about 1 m. For example, if the magnet lengths are 1 cm, the polarization beat length in the low-bi fiber should be 2 cm. The beat length can be adjusted by fine-tuning the wavelength of the fiber amplifier. The magnet array for this example contains about 200 magnets which can be held rigidly in an aluminum frame.

If the fibers propagate only a single transverse mode at the lasing wavelength, then mode conversion is not an issue. However, high-power fiber lasers often use large cores which can propagate several transverse modes. Good output beam quality in the fundamental mode is then possible by inducing high loss for the higher-order modes, using a technique such as tight coiling of the fiber. Since the low-bi fiber in the magnet array is not coiled, it is important to avoid perturbations such as twists which might lead to mode conversion in this fiber.

Figure 6A:
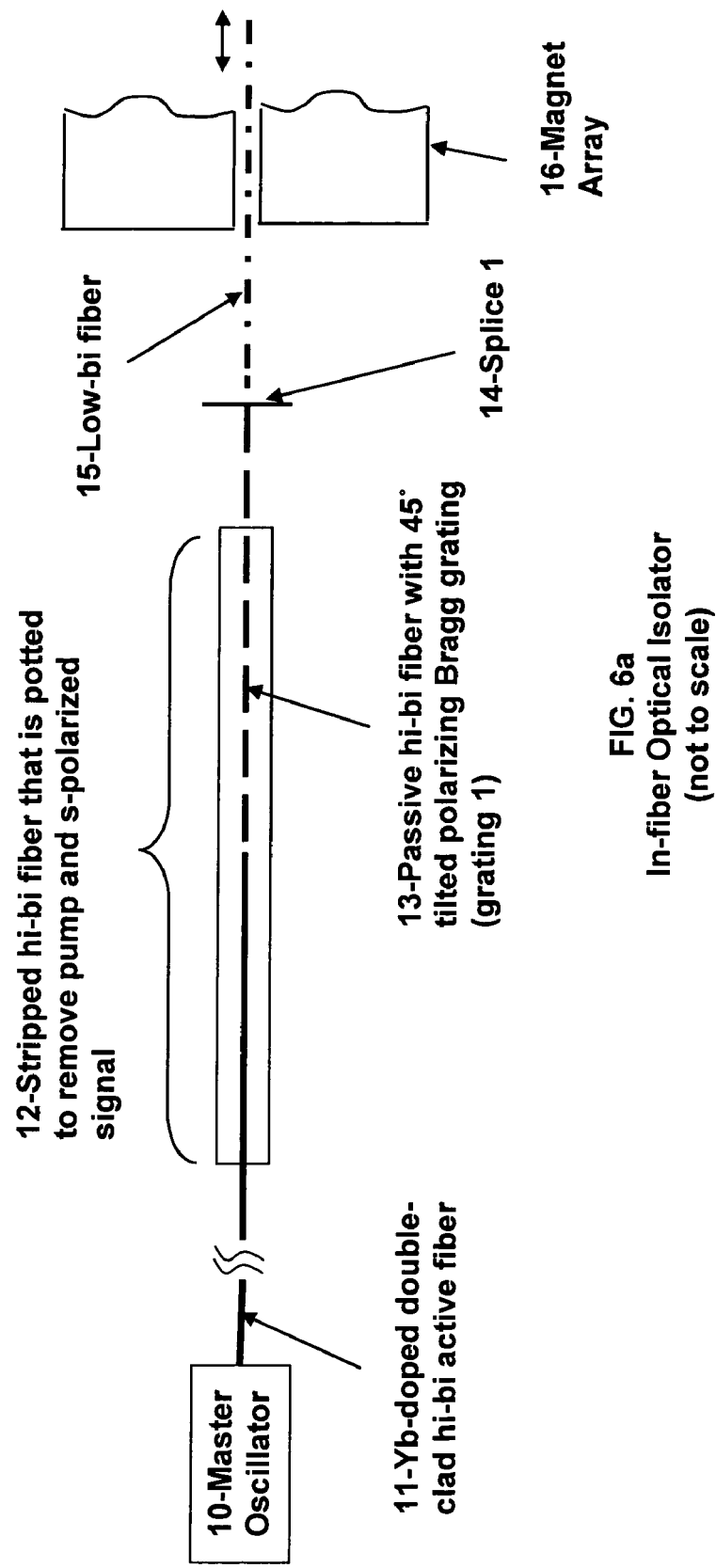
FIG. 6a shows one half of the in-fiber optical isolator, including the connections between the active Yb-doped hi-bi fiber, the photosensitive hi-bi fiber with the polarizing tilted fiber grating, and the low-bi fiber which enters the magnet array.

As shown in FIG. 6a, one end of the low-bi fiber 15 is fusion spliced to sections of photosensitive high-birefringence (hi-bi) polarization-maintaining fiber 13. The hi-bi fiber 13 contains 45° tilted fiber Bragg gratings oriented with the birefringence axes of the fiber. On one end of the low-bi fiber the splice 14 (splice 1) to hi-bi fiber 13 containing grating 1 is made with the birefringence axes of the low-bi fiber and the hi-bi fiber parallel. On the other end the splice (splice 2) (20 of FIG. 6b) to hi-bi fiber 22 containing grating 2 is made with the birefringence axes at a relative angle of 45°. The fiber can be shifted longitudinally within the magnet array such that splice 2 is located at an optimal position. This position is where laser light entering the second hi-bi fiber 22 in the forward direction is linearly polarized and transmitted by grating 2. At this position backward light transmitted by grating 2 will be removed by grating 1, forming an isolator. Such optimal positions occur periodically once per beat length.

Since no significant Faraday rotation occurs within the hi-bi fiber, either splice 1 or splice 2 can be shifted inside the magnet array to reduce excessive Faraday rotation. Considering that the magnetic field decreases transversely away from the center of the gap, such a shift for fibers in the strongest field near the center of the gap allows the Faraday rotation to be kept close to 45° for all the fibers in the magnet array. Excessive Faraday rotation can also be reduced by a mismatch between the magnet period and the polarization beat length. The beat length is wavelength dependent, which is a factor limiting the wavelength range over which the isolator functions. This range is greater for a narrow-band fiber amplifier, where the position of splice 2 can be adjusted depending on the wavelength, than for a broad-band fiber amplifier.

If, as is usually the case, the dual-clad Yb-doped hi-bi active fiber 11, 23 of the fiber amplifier is not photosensitive, additional splices 14, 20 will be required between this fiber and the hi-bi fiber 13, 22 containing the tilted gratings. These splices are made after removing the polymer outer cladding near the end of the active fiber. Then the spliced section, including the grating, can be encased in transparent material with a higher refractive index, such as glass with a low melting temperature. This will protect the fiber and allow the extraction of undepleted pump light and s-polarized laser light scattered out of the core by the grating.

Figure 1:
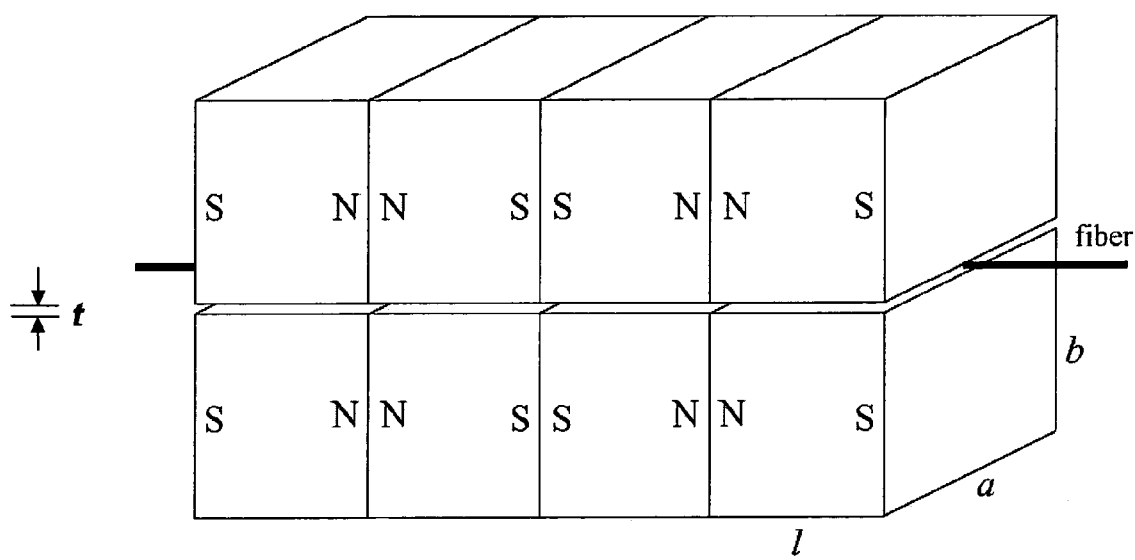
FIG. 1 shows two periods of a magnet array of block-shaped magnets used for Faraday rotation of light within a fiber.

FIG. 1 shows two periods of a magnet array of block-shaped magnets used for Faraday rotation of light within a fiber. The entire array contains about 50 periods (200 magnets) and can have multiple parallel fibers within the gap. A grooved plastic sheet within the gap can be used to keep the fibers straight. Typical dimensions are a=24 mm, b=12 mm, l=10 mm, and gap spacing t=0.6 mm. Magnet material with a residual field of 1.33 T provides an effective field (the fundamental Fourier component) of 0.75 T for the central fiber. The magnets are held in position by a non-magnetic frame (not shown). The frame can be constructed to allow adjustment of the gap t. Calculation shows that the magnetic field attenuates rapidly as the transverse distance from the center of the array increases, reaching 1 gauss levels at about 4 cm from the center.

Figure 2:
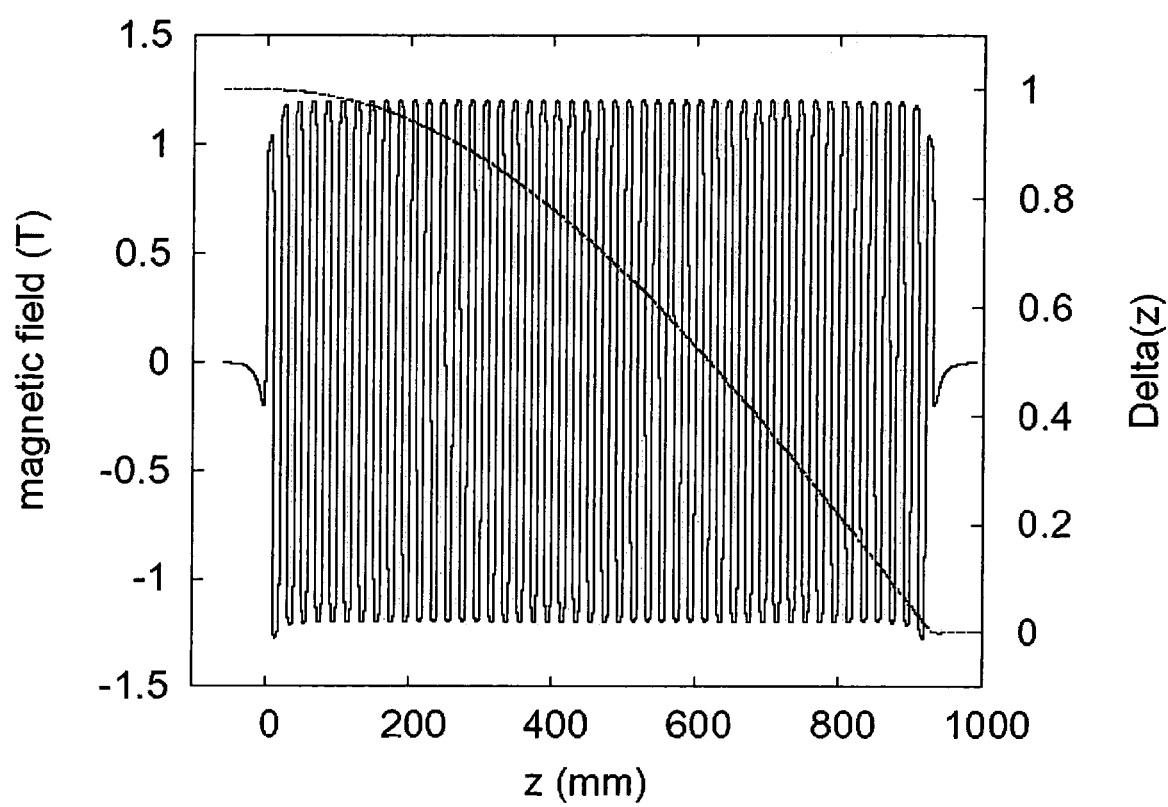
FIG. 2 shows the calculated oscillatory longitudinal magnetic field in the central fiber as a function of longitudinal position.
Figure 3:
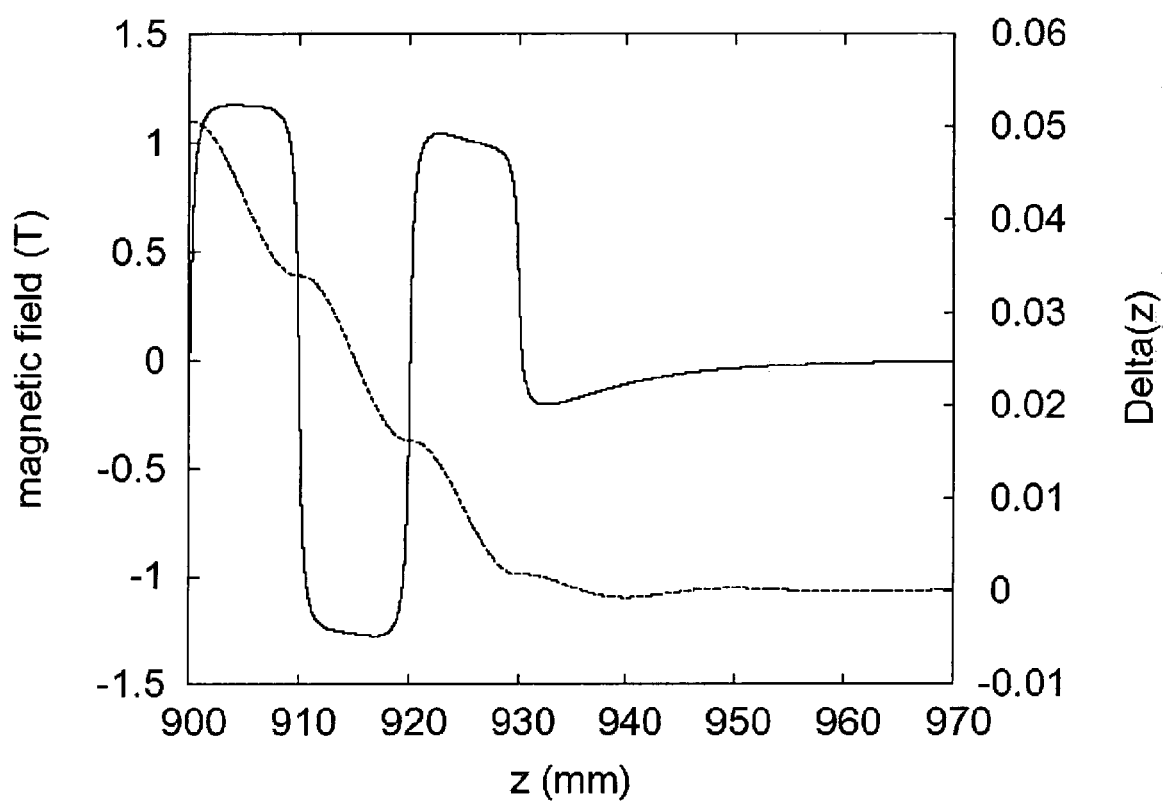
FIG. 3 is an expanded view of the curves in FIG. 2 near the end of the magnet array.
Figure 4:
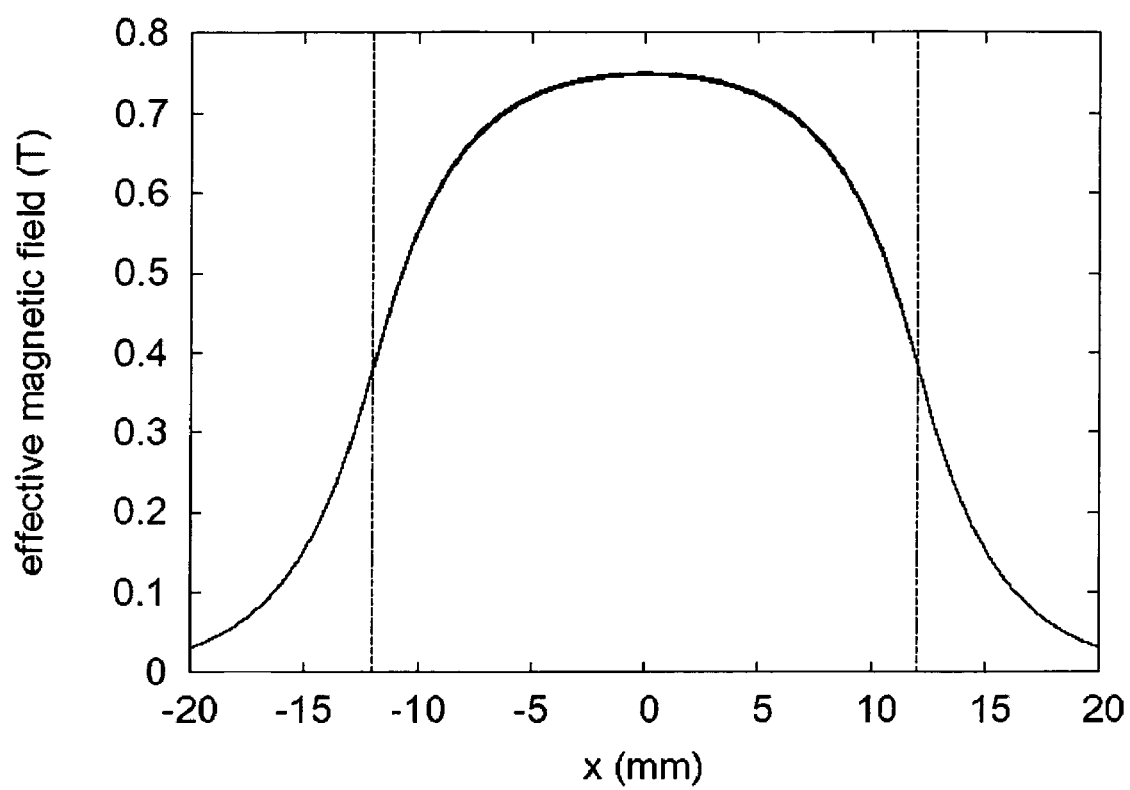
FIG. 4 shows the dependence of the effective field on transverse position within the gap.

FIG. 2 shows the calculated oscillatory longitudinal magnetic field in the central fiber as a function of longitudinal position. Light enters the magnet in one fundamental polarization of the low-bi fiber. The decreasing function Delta(z) is the difference between the power with this polarization and the power with the orthogonal polarization, normalized to the total power. After traversing 93 magnet pairs, a Faraday rotation of 45° has been achieved. Thereafter, the polarization in the low-bi fiber oscillates between linear and circular. To make an isolator, splice 2 must be positioned where the polarization is linear and is transmitted by grating 2. FIG. 3 is an expanded view of the curves in FIG. 2 near the end of the magnet array. The ripples apparent in Delta(z) (dashed curve) are characteristic of quasi-phase matching. FIG. 4 shows the dependence of the effective field on transverse position within the gap. Vertical dashed lines indicate the magnet edges.

Figure 5:
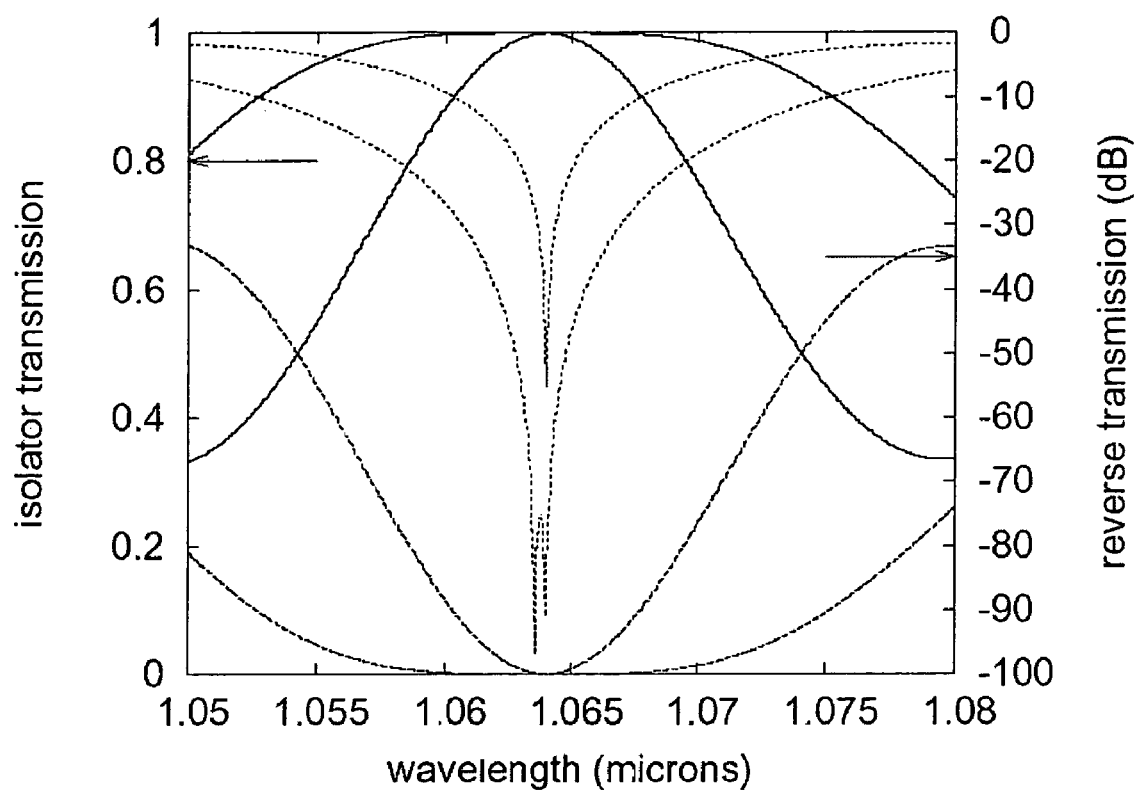
FIG. 5 is a plot of the calculated wavelength acceptance of the in-fiber isolator, assuming that the polarizers are perfect, that the birefringence of the low-bi fiber is independent of wavelength and that phase matching and 45° Faraday rotation occurs at 1064 nm.

FIG. 5 shows the calculated wavelength acceptance of the isolator, assuming that the polarizers are perfect, that the birefringence of the low-bi fiber is independent of wavelength and that phase matching and 45° Faraday rotation occur at 1064 nm. The arrows indicate the typical performance of currently available isolators. The solid curves are for forward transmission and the dashed curves are for reverse transmission. The curves with sharp minima show the reverse transmission in dB. The wider curves are for transmission of a narrow-band signal, where the position of splice 2 can be optimized for the wavelength present. The narrower curves are for a fixed position of splice 2.

FIG. 6a shows a laser source 10 transmitting light along the active Yb-doped hi-bi fiber 11. The active fiber 11 is connected to a photosensitive hi-bi fiber 13 with a polarizing tilted fiber Bragg grating (grating 1), and spliced 14 to a low-bi fiber 15 that enters the magnet array. The ends of both hi-bi fibers, including the grating section, have been stripped of polymer and embedded in higher-index potting material 12 to extract undepleted pump radiation and s-polarized laser light. High-power laser light with p polarization is then transmitted into the low-bi fiber 15. The other end of the low-bi fiber (FIG. 6b) is also spliced 20 (splice 2) to hi-bi fiber 22 containing a polarizing grating (grating 2), and s-polarized light is also extracted by that grating through potting material 21. If a further stage of amplification is desired, photosensitive fiber 22 is spliced to another section 23 of Yb-doped hi-bi fiber.

The invention is usable for efficient optical isolation in fiber lasers and amplifiers operating at multi-kilowatt levels, whereas the currently available isolators are lossy and are limited to about 10 W. The invention permits multiple isolators to make use of a single magnet array. The dimensions of the magnets may vary from those in the example given above, and different cross-sectional magnet shapes may be used.

A glass with a larger Verdet constant than that of fused silica could be used for the low-bi fiber. However, such glasses generally have high losses and a large refractive index, making low-reflection splices to fused-silica fiber problematical. A different type of polarizer could be used instead of the tilted fiber gratings. For example, coupling of one polarization from one hi-bi fiber into a different hi-bi fiber is possible (H. C. Lefèvre, P. Simonpiétri, and P. Graindorge, "High performance polarization splitting fibre coupler," Electron. Lett. 24, 1304-1305 (1988)). Such polarizers could allow one to construct a polarization-independent isolator. However, the demonstrated polarization selectivity of such polarizers is not as good as that of tilted fiber gratings. The invention could be used at other wavelengths than near 1064 nm. However, the Verdet constant gets smaller rapidly at longer wavelengths, necessitating a longer magnet array.

The invention claimed is:

1. An in-fiber optical isolator for high-powered operation, all fibers having first and second ends, the isolator comprising:
    a. a first passive high-birefringent fiber with a 45 degree tilted polarizing Bragg grating, a first end of which is connected to a first end of an active polarization-maintaining high-birefringent double-clad fiber with a glass core doped with Yb or Nb ions, both ends stripped and potted to thereby allow removal of pump and s-polarized signals;
    b. a low-birefringent fiber with a polarization beat length at the lasing wavelength of approximately 2 cm and having a first end fusion spliced to the second end of said first passive fiber and oriented with the birefringence axes of said low-birefringent fiber and said first passive fiber parallel;
    c. a first linear array of pairs of block-shaped permanent magnets butted against neighboring magnet pairs in a repelling configuration and adjacent to a second similar magnet array but separated by a gap wherein said low-birefringent fiber can lie and is free to move longitudinally, and wherein the number and size of the magnets are selected to obtain a Faraday rotation of 45 degrees;
    d. a second passive high-birefringent fiber with a 45 degree tilted polarizing Bragg grating, a first end of which is fusion spliced to the second end of said low birefringent fiber outside of said magnet array, the birefringent axes of said second passive fiber being oriented 45 degrees relative to the birefringent axes of said low-birefringent fiber; and
    e. a second active fiber having one end connected to a second end of said second passive fiber, both ends being stripped and potted to thereby allow removal of pump and s-polarized signals, whereby backward light transmitted by said second passive fiber will be removed by said first passive fiber forming an isolator.

2. The in-fiber optical isolator of claim 1, wherein the operating power is greater than 10 Watts.

3. The in-fiber optical isolator of claim 1, wherein multiple parallel low-birefringence fibers traverse a common magnet array to thereby serve multiple in-fiber optical isolators.

4. The in-fiber optical isolator of claim 1, wherein one of the splices between low-birefringence fiber and high-birefringence passive fiber is translated inside the magnet array to reduce excessive Faraday rotation.

* * * * *